United States Patent [19]

Pimley et al.

[11] Patent Number: 5,022,984
[45] Date of Patent: Jun. 11, 1991

[54] FROTH FLOTATION APPARATUS AND METHOD

[75] Inventors: John J. Pimley, Gwent, United Kingdom; Christopher M. Vitori, Middletown, Ohio; Irenee J. Phillippe, Monroe, Ohio; Paul G. Marsh, Hamilton, Ohio

[73] Assignee: The Black Clawson Company, Middletown, Ohio

[21] Appl. No.: 486,477

[22] Filed: Feb. 28, 1990

[51] Int. Cl.$^5$ .................. B03D 1/24; B21B 1/32
[52] U.S. Cl. .................. 209/170; 209/168; 210/221.2; 261/123; 162/4
[58] Field of Search .......... 209/164, 168, 169, 170; 210/221.1, 221.2, 703, 704, 705; 162/4, 5, 6, 7, 55; 261/DIG. 75, 123

[56] References Cited

U.S. PATENT DOCUMENTS

| | | | |
|---|---|---|---|
| 1,323,373 | 12/1919 | Myers | 209/170 |
| 1,497,804 | 6/1924 | Spearman | 209/170 |
| 2,267,496 | 12/1941 | Ellis | 209/170 |
| 2,646,882 | 7/1953 | Frost | 209/170 |
| 3,286,844 | 11/1966 | Juell | 209/170 |
| 4,083,750 | 4/1978 | Newns | 162/336 |
| 4,186,094 | 1/1980 | Heldberg | 209/170 |
| 4,190,522 | 2/1980 | Tra | 209/170 |
| 4,288,319 | 9/1981 | Heijs | 209/170 |
| 4,399,028 | 8/1983 | Kile | 209/170 |
| 4,470,903 | 9/1984 | van Leeuwen | 209/170 |
| 4,512,888 | 4/1985 | Flynn | 209/170 |
| 4,548,673 | 10/1985 | Nanda | 209/170 |
| 4,722,784 | 2/1988 | Barnscheidt | 209/170 |
| 4,750,994 | 6/1988 | Schneider | 209/170 |
| 4,952,308 | 8/1990 | Chamberlin | 209/170 |

FOREIGN PATENT DOCUMENTS

| | | | |
|---|---|---|---|
| 90234 | 10/1983 | European Pat. Off. | 209/170 |
| 2731714 | 7/1976 | Fed. Rep. of Germany | 209/170 |
| 738676 | 6/1980 | U.S.S.R. | 209/170 |
| 2162092 | 1/1986 | United Kingdom | 207/170 |
| 10201 | 11/1989 | World Int. Prop. O. | 209/170 |

Primary Examiner—Stanley Silverman
Assistant Examiner—Thomas M. Lithgow
Attorney, Agent, or Firm—Biebel, French & Nauman

[57] ABSTRACT

Apparatus for separating contaminant particles from liquid suspension stock, e.g. in the de-inking of used news print, is characterized by one or more of a plurality of features which contribute to increasing the capacity and effectiveness of the apparatus, including the provision of a cell comprising inner and outer annular chambers of substantially equal depth with the inlet and outlet connections for the stock being located adjacent the bottoms of the two chambers to force the stock to travel through the full depth of each chamber, and also the provision of a baffle of substantial width on the top of the wall between the two chambers to spread the stock overflowing that wall into a thin film. Other features include the use of an explosion-type flowbox to aerate the stock as it is delivered to froth flotation apparatus, and the provision of a variety of alternative constructions for spreading aerated grey stock into a film and causing that film to flow a substantial distance in a substantially horizontal plane in order to minimize the distance for travel of bubbles in the stock to the top of the film and thereby to expedite the resulting formation of a layer of froth at top of the film.

7 Claims, 4 Drawing Sheets

FROTH FLOTATION APPARATUS AND METHOD

CROSS-REFERENCE TO RELATED APPLICATION

Ronald D. Cruea and Michael F. Kinne, Ser. No. 448,439, filed Dec. 11, 1989, and co-owned.

BACKGROUND OF THE INVENTION

As is pointed out in the co-owned U.S. Pat. No. 4,399,028, froth flotation apparatus is well-known for the separation of small contaminant particles from liquid suspension stock, and the assignee of that patent is particularly interested in the development and manufacture of froth flotation apparatus for use in the de-inking of waste paper furnishes so that the resulting stock can be reused for the manufacture of paper. For example, the paper making industry presently has great interest in the deinking of used newsprint and also in the de-inking of waste white papers, such as ledger papers, to produce a stock which can be used in the manufacture of tissue.

The above patent discloses froth flotation apparatus comprising a generally cylindrical side wall and internal partitions which cooperate to define a plurality of vertically stacked, annular flotation cells surrounding a common discharge conduit for froth. The stock suspension to be de-inked or otherwise cleaned is supplied to the top cell by an inlet which includes provision for aerating the stock as it is delivered into the cell. The contaminant-containing froth which develops on the top of the liquid in the uppermost cell is skimmed off into the froth discharge conduit, while the stock cleaned in passing through that cell is delivered to the next lower cell, again accompanied by aeration, and the same process is repeated in each of the lower cells successively as stock passes therethrough to the outlet conduit for accepted stock from the lowermost cell.

In that patent, the mechanism for aerating the stock as it is delivered into each cell comprises a hollow cylinder member of porous material, such as sintered bronze, mounted for rotation in the path of the stock suspension being delivered to each cell on an axis extending transversely of the inlet conduit to the cell. Compressed air is supplied to the interior of this cylinder while it is being rotated, and passage of the air through and discharge from the pores in the cylinder produce bubbles which effect the desired aeration of the stock and the creation of froth within the cell.

The above-identified application discloses an improved aerating mechanism for incorporation in froth flotation apparatus—known as a "sparger"—which provides a highly effective aerating action on the stock delivered to froth flotation apparatus while requiring substantially less power consumption than existing apparatus for the same purpose, and which at the same time produces more effective mixing of all constituents of the supply stock, including whatever chemicals may be added thereto, than is accomplished by conventional apparatus.

The primary active component of the sparger of that application is a drum-like rotor which is mounted for rotation on an axis extending transversely of the stock inlet conduit to each cell, and which has an irregular outer surface, e.g. multiple circumferentially spaced ribs or other protuberances, capable of a mixing and/or shearing action. The stock inlet conduit is also provided with an air supply conduit extending into it from upstream of the rotor and having a discharge nozzle which extends the full width of the rotor and is positioned in close relation to the surface of the rotor on the upstream side thereof so that only a running clearance is provided therebetween.

In the operation of that apparatus, the liquid stock suspension is delivered to the cell through the inlet conduit at a flow velocity which may be relatively low, but the rotor is driven at a rate which will cause its outer surface to travel at a relatively high speed past the outlet end of the air nozzle. This surface passes the nozzle outlet at a desired high speed, thereby drawing air from the nozzle into the stock inlet conduit and simultaneously mixing that air with the surrounding stock.

SUMMARY OF THE INVENTION

A primary objective of the invention is to increase the capacity of froth flotation apparatus in terms of the throughput of gallons of stock in a given time, and it accomplishes this objective by means of one or both of two features. One of these features involves increasing the volume of air distributed as bubbles in aerated stock which collect contaminent particles as they rise and create a layer of froth on top of the stock, and the other involves minimizing the depth of a continuous stream of the aerated stock in order to reduce the distance through which the bubbles in the stock must travel to reach the surface of the stream and thus to accelerate the formation of the desired layer of froth on top of the liquid stock.

The latter of these features derives from discovery of the fact that the greatest portion, e.g. 85 to 90%, of the air in aerated stock at normal deinking consistency naturally rises toward the surface at a rapid rate, e.g. in the order of 2 inches per second. Even at this rate, however, contaminants which the bubbles encounter on their way to the top will attach themselves thereto and thus be conveyed into the layer of froth on top of the stock.

Therefore, when a stream of aerated stock is spread into a thin film, the resulting minimizing of the distance for travel of air bubbles in the stock to the top of the film significantly expedites the resulting formation of a layer of froth at the top of the film which can then be separated from the remaining liquid portion of the film. Several embodiments of the invention which operate according to this discovery are included in the description of the preferred embodiments of the invention which follows.

Froth flotation apparatus embodying these aspects of the invention can utilize spargers of the characteristics disclosed in the above patent and application, but the objects and accomplishments of the present invention include the provision of a sparger which offers the advantage that it requires no moving parts and relies only on the pressure at which the stock is supplied thereto to produce highly effective aerating action on the stock which it delivers to froth flotation apparatus. More specifically, the sparger provided by the invention closely resembles a headbox of the "explosion chamber" type with which paper making stock may be delivered to the forming member of a paper machine.

When such a headbox is used on a paper machine, a high speed stream of stock fed into the headbox is quickly changed in speed and direction of flow by rapid expansion and/or impingement on an obstruction within the chamber, causing the stream to disintegrate or "explode" and thereby to cause effective mixing and defloculation of the stock by the generation of turbulence. In the practice of the present invention, the same actions are relied upon to effect thorough mixing of stock and air by explosion immediately prior to discharging the resulting aerated stock into an enviroment wherein the air bubbles rise to the surface while collecting and carrying contaminant particles into the resulting layer of froth on top of the stock.

DESCRIPTION OF THE PREFERRED EMBODIMENTS

Figures 1, 3, 4:
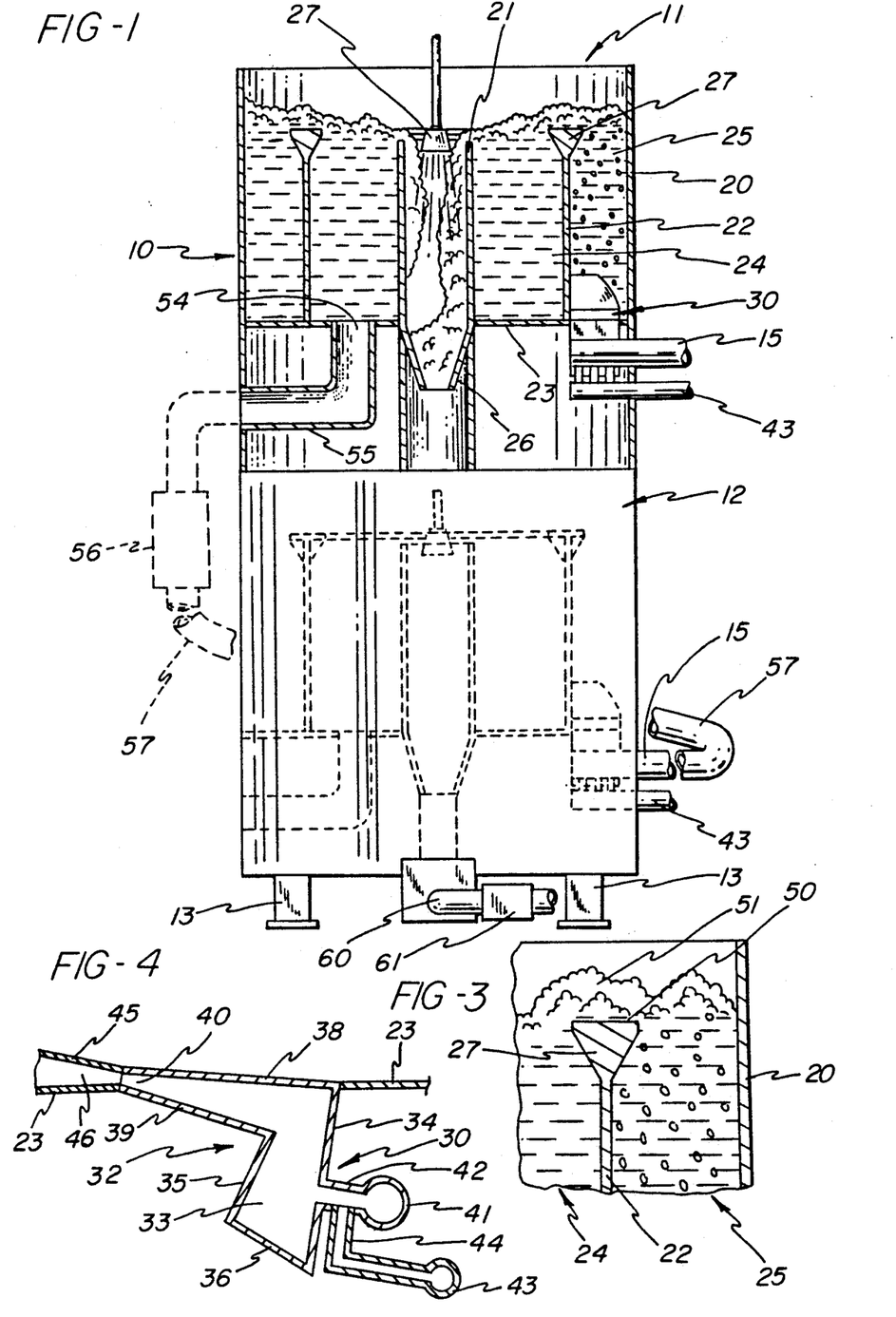
FIG. 1 is a side elevational view, partly broken away, illustrating froth flotation apparatus in accordance with the invention.
FIG. 3 is an enlarged fragment of FIG. 1.
FIG. 4 is a section on a larger scale taken on the line 4—4 in FIG. 2.
Figures 2, 5, 6, 10:
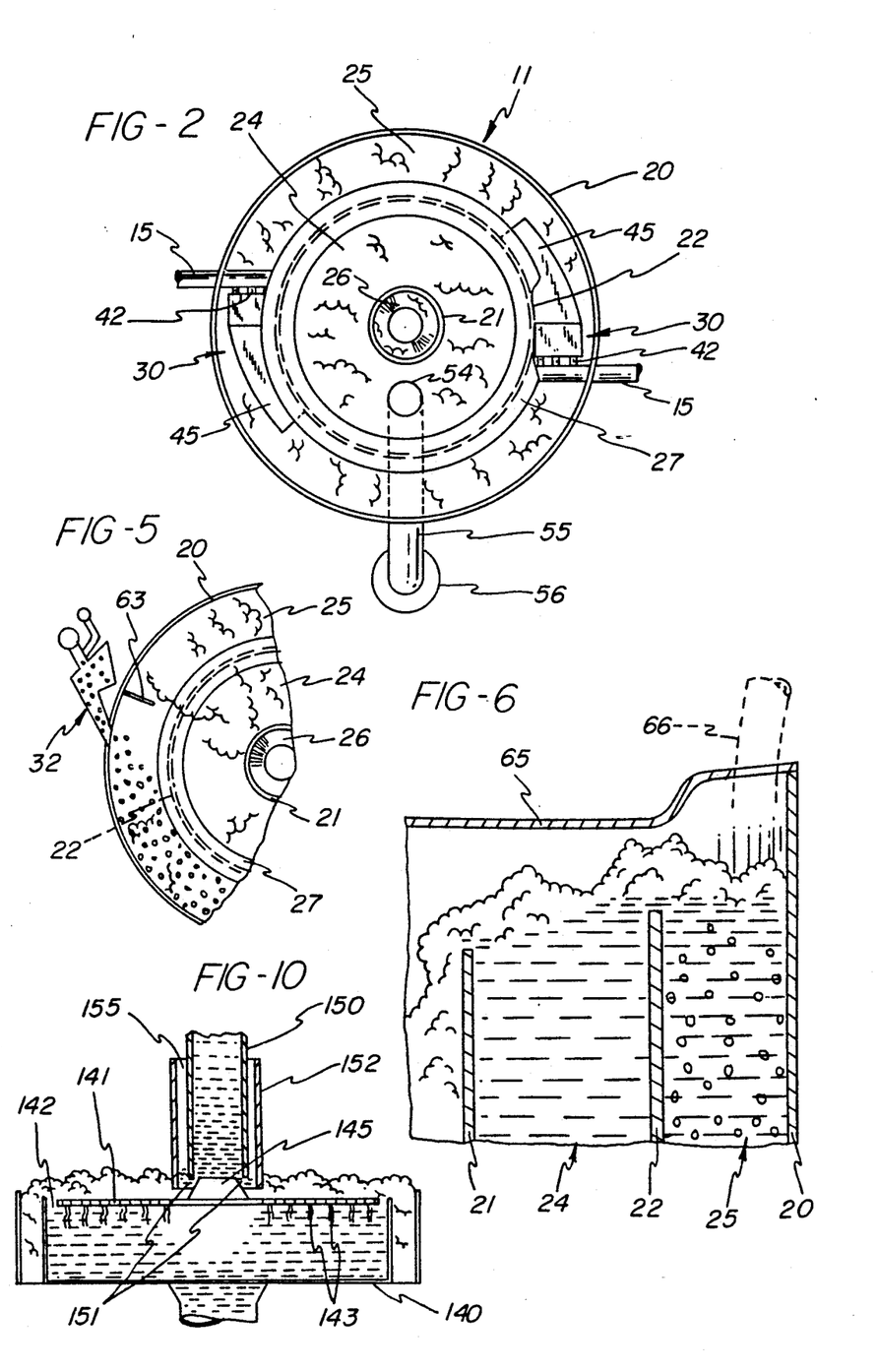
FIG. 2 is a top view of the apparatus shown in FIG. 1.
FIG. 5 is a fragmentary plan showing certain modifications of the apparatus in FIGS. 1-3.
FIG. 6 is a view similar to FIG. 3 showing another form of the invention.
FIGS. 9 and 10 are views similar to FIG. 8 illustrating still other embodiments of the invention.

The overall construction of froth flotation apparatus in accordance with the invention is shown in FIGS. 1 and 2 as a tower 10 comprising two cells 11 and 12 of essentially the same construction arranged in vertically stacked relation on base structure comprising multiple legs 13. In operation, the aerated stock suspension to be treated, commonly referred to as "gray" stock, is initially delivered to the uppermost cell 11 by a plurality of inlet conduits 15, and after undergoing flotation cleaning treatment successively in each cell, is discharged as accepted stock from the bottom of the lower cell 12. It is to be understood that the tower 10 may include additional cells, as shown in the above patent and application.

The cell 11, and each of the other cells in the tower comprises a cylindrical outer wall 20, a cylindrical inner wall 21 and a cylindrical intermediate partition wall 22, annular all of which cooperate with a common bottom wall 23 to define inner and outer concentric annular chambers 24 and 25. The diameters of these walls are preferably selected to provide desired flow rates and capacity, and as one example, the diameters for the three walls may be 6 feet for outer wall 20, 4 feet for intermediate wall 22, and one foot for inner wall 21.

The inner wall 21 is in effect a tube which constitutes the top of the discharge conduit for froth common to all cells in the tower, and it includes a funnel section 26 at its bottom end which delivers froth to the top of the tube 21 in the next lower cell, aided by one or more showers 27 as shown in FIG. 1. The inner wall 21 is of lesser height than the intermediate wall 22 by a small dimension, e.g. 2 inches or less where the wall 22 is 18 inches high, and the intermediate wall 22 is in turn of lesser height by a larger dimension, e.g. 6 inches, than the outer wall 20, so that each of walls 21 and 22 serves as an overflow outlet from the chamber on the outside thereof. In addition, the intermediate wall 22 has an annular baffle 27 mounted on the top thereof which has a horizontal surface of substantial radial extent, e.g. 6 inches, the purpose and function of which are described hereinafter.

The cell 11 is provided with one or more stock inlet conduits 15 arranged to deliver gray stock under pressure into the outer chamber 25 from a supply source (not shown) outside the tower. Each inlet conduit 15 encloses sparger means for aerating the stock as it enters the bottom of the outer chamber. Some of the advantages of the present invention can be achieved using any of the spargers disclosed in the above patent and application, but for optimum performance with a cell 11 of the above dimensions, two of the novel sparger means indicated generally at 30 should be used.

Referring particularly to FIG. 4, the basic component of sparger means 30 is an explosion type flowbox 32 similar to the paper machine flowbox disclosed in Newns and Attwood U.S. Pat. No. 4,083,750. This flowbox 32 encloses an explosion chamber 33 having an upstream wall 34 and a downstream wall 35 which converge upwardly from a bottom wall 36 toward a top wall 38 that cooperates with a lower outlet wall 39 to form slice lips defining a discharge slot 40. For preferred operating conditions, the upper slice lip 38 should have a hinged or otherwise vertically adjustable connection with the wall 34 for regulating the effective height of the slot 40.

Each flowbox 32 is supplied with stock under pressure from a manifold 41 which is connected by multiple inlet pipes 42 of individually small flow area with the explosion chamber 33 through its upstream wall 34. Each manifold 41 is supplied with stock under pressure by its associated inlet conduit 15 leading from a pump (not shown) or other pressurized supply source. In addition, each flowbox 32 is provided with a continuous supply of air, which may be pressurized if needed, as further described hereinafter. Preferably, the air is supplied from a supply pipe 43 directly to each of the small pipes 42, by individual tubes 44.

The flowbox 32 is so mounted in an appropriately sized opening in the bottom wall 23 of outer chamber 25 that its lower slice lip 39 is in line with the wall 23, and the outlet slot 40 is essentially in line with the upper surface of wall 23 to discharge stock along the surface of this wall. In addition, the slot 40 is extended and changed in dimensions by a deflector 45 that forms a continuation of the upper slice lip 38 and has its radially inner edge curved to match the outer surface of wall 21 to which it is secured to enclose the inside of the slot 40.

The deflector 45 is inclined upwardly away from its connection to the slice lip 38, its outer edge is curved about a different radius from its inner edge, and it is provided along its outer edge with a side wall 46 which cooperates therewith to decrease the width and increase the ultimate height of the extended slot 40. In one satisfactory example for a cell of the dimensions given above, the outlet end of the slot 40 may be 9 inches wide and 0.5 inch in height, while the deflector 45 is 20 inches in length, and its inclination and radial dimensions are such that the outlet end of the extended slot is 4.5 inches wide and 2.4 inches in height.

It has been found in test operation that the addition of deflectors 45 as described above offers significant advantages over having the stock discharged into the chamber 25 directly past the end of the upper slice lip 38 where the slot 40 has the smallest flow area. More specifically, it has been found that the use of the deflector 45 makes it possible to increase very greatly the amount of air which can be added. For example, if the volume of added air at atmospheric pressure equals 5% of the volume of stock without the deflector, addition of the deflector makes it possible to increase that percentage to as much as 25 to 30% of the stock volume.

Another advantage provided by the deflector 45 is the minimizing of vortexing in the chamber 25 such as can occur with a high volume supply rate of stock when such deflector is not present. More specifically, in the absence of the deflector 45, the stock enters the chamber 25 tangentially thereof and follows around the inner surface of the outer wall 20, which tends to create a vortexing action. In contrast, with the entering flow confined and directed along the intermediate wall 22 by the deflector 25, the flow will then tend to cross the chamber 25 until it bounces off the wall 20, and it will continue with more of a zig-zag pattern around the chamber 25 rather than vortexing adjacent its outer periphery.

In operation, as the discharge flows from the inlet pipes 42 enter the explosion chamber 33 at relatively high speed, they are simultaneously decelerated and also deflected downwardly and then upwardly by the walls 35 and 36 until they accelerate as they reach the discharge slot 40. As the multiple flows of stock and air from inlet pipes 42 intermix on their way through the explosion chamber 33, the air is broken into multiple small bubbles which are thoroughly mixed with the liquid suspension and also reduced in size to a great multiplicity of small bubbles, to produce a discharge flow of substantially uniformaly aerated stock from the discharge slot 40.

As this aerated flow enters and begins to circulate around the outer annular chamber 25, the air bubbles rise to the top of the liquid in the chamber and collect there as a similarly circulating layer of froth containing the solid contaminant particles which attached themselves to the rising bubbles. As noted above, the great majority of the air bubbles will rise relatively rapidly as the stock travels around the chamber 25. As soon as the liquid in chamber 25 reaches a level above baffle 27 on the partition wall 22, it will overflow and spread across the entire upper surface of the baffle to the chamber 24, and this provides significant practical advantages.

Referring to FIG. 3, the liquid portion 50 of the suspension which flows across the baffle 27 will be a relatively thin film covered by a relatively much thicker layer 51 of froth. However, the thin liquid film 50 will still contain a substantial quantity of contaminant-laden bubbles, and because the vertical dimension of the film is so small, preferably in the range of 1 to 4 inches depending upon the flow rate through the apparatus, there will be a correspondingly short distance for these bubbles to travel before they reach the top of the liquid and join the layer of froth already there.

In test operation, it has been established that this operating characteristic of the apparatus of the invention greatly increases both its efficiency and its capacity, in terms of gallons of stock put through the apparatus in a given time interval, e.g. 500 gallons per minute as compared with 175 gallons per minute for the apparatus shown in the above patent and application. In addition, because the baffle 27 forces the flow pattern of the stock near the top of the chamber 25 from essentially circumferential to predominantly radial, the froth layer is naturally caused to travel toward the inner wall 20 for discharge from the cell, and this change of flow pattern also effectively eliminates the possibility of dead spots of floating stock in the chamber 25.

In normal continuous operation of the apparatus, the major portion of collection of foam on top of the liquid takes place in the outer chamber 25. The liquid component of the flow over the wall 22 and baffle 27 into the inner chamber 24 continues to circulate therein while additional air bubbles rise to the top thereof and join the layer of froth from the chamber 25, which travels across the chamber 24 until it overflows the inner wall 20 and falls to the bottom of the tower as described above. The relatively clean stock at the bottom of the chamber 24 is continuously withdrawn through one or more outlet ports 54, from which a pipe 55 leads to a pump 56 from which a pipe 57 supplies stock under pressure to each of the inlet conduits 15 for the next lower cell, i.e. the cell 12 in FIG. 1.

The accepted stock from the lowermost cell 12 is piped to a common outlet conduit 60 having a control valve 61. This valve 61 should be adjusted automatically, as by level sensing means in the first chamber 24, to maintain the liquid level in each of the inner chambers 24 just below the top of the inner wall or tube 20 so that the froth which overflows the wall 22 and baffle 27 can continue across the chamber 24 and similarly overflow the top of wall 20 into the froth discharge conduit constituted by the series of aligned tubular walls 20 and funnel sections 26.

In the apparatus shown in the above patent and application, there is a single annular chamber, and the inlet and outlet are on opposite sides of a relatively low weir over which stock must flow in order to travel from the inlet to the outlet. It has been found necessary in the operation of such apparatus to maintain the flow rate of the stock around the cell relatively low, in order to prevent the formation of waves and other undesirable turbulence. Also, it is possible for stock to short circuit over the weir and reach the outlet port while it still contains too many bubbles.

In contrast, the cell of the invention has a pair of relatively deep annular chambers, and the stock inlets and outlets are at or near the bottoms of the two chambers so that short circuiting is impossible. Also, the action of the stock in overflowing the baffle 27 creates a substantial radial component of flow in the stock adjacent the surface in the inner chamber 24, and the resulting movement of the froth layer to and into the tubular wall 20 reduces the need for skimming apparatus as is shown in the above patent and application, expecially when this wall 20 is eccentrically located as described hereinafter in connection with FIG. 5.

FIG. 5 illustrates a modified construction in accordance with the invention wherein the aerated gray stock is delivered into the chamber 25 by one or more flowboxes 32 of the same construction described in connection with FIG. 4, but each such flowbox is mounted on the outer wall 20 of the cell with the discharge slot therein extending vertically. For such an installation, the flowbox should be arranged so that it will not discharge the flow of stock therefrom along the inner surface of the cell wall 20, since that could promote vortexing. Rather, however, the headbox should be arranged as shown in FIG. 5 so that the flow therefrom will be directed across the chamber 25 and thus caused to bounce back and forth as it circulates around the chamber, similarly to the results achieved by means of the deflector 45 in FIG. 2.

In the modified arrangement shown in FIG. 5, vortexing may be effectively prevented by mounting a baffle 63 in the chamber 25 just upstream of the outlet from flowbox 32 and in line with a radius of wall 20. For example, with the cell of the dimensions listed above, satisfactory results have been obtained with a rectangular baffle of sheet metal 6 inches wide and 12 inches high with its inner and lower edges secured to the walls 20 and 23 respectively.

FIG. 5 also illustrates another optional modification of the invention in that the tubular wall 21 is laterally offset, i.e. eccentrically located, with respect to the common center of cell walls 20 and 22. With this arrangement, if the froth on top of the stock in chamber 24 tends to collect and circulate around the outer periphery of the chamber, the radially inner portion thereof will still fall into the tubular wall 20 as it approaches the narrow portion of the chamber, and this will promote cascading of the remaining portion of the circulating foam layer.

FIG. 6 illustrates a number of other optional modifications of the apparatus shown in FIGS. 1-3. More specifically, the baffle 27 is omitted so that when the stock in the outer chamber 25 rises to the height of the wall 22, it will overflow that wall as it overflows the baffle 27 in the apparatus as shown in FIGS. 1-3. This simplified modification of the flotation cell of the invention therefore does not include means for spreading the aerated stock into a thin film which flows a substantial linear distance. However, it does provide a pair of relatively deep chambers through which the stock must travel before reaching an outlet port from the inner chamber 24, and thus cannot short circuit to an outlet port as in the apparatus shown in the above patent and application. The form of the invention shown in FIG. 6 therefore offers substantially improved performance and capacity as compared with those prior cells.

FIG. 6 also illustrates an additional optional feature of the invention comprising a cover 65 which encloses the top of the cell 11 and is provided with an inlet connection 66 for pressurized air in order to impose a superatmospheric pressure on the tower 10. This is particularly useful in accelerating the evacuation of froth through the series of tubular walls 20, and preferably the cover 65 is inwardly dished, as indicated at 67, for increased resistance to superatmospheric pressure within the cell. It is to be understood that the other embodiments of the invention described herein can similarly be pressurized as an optional modification.

Figure 7:
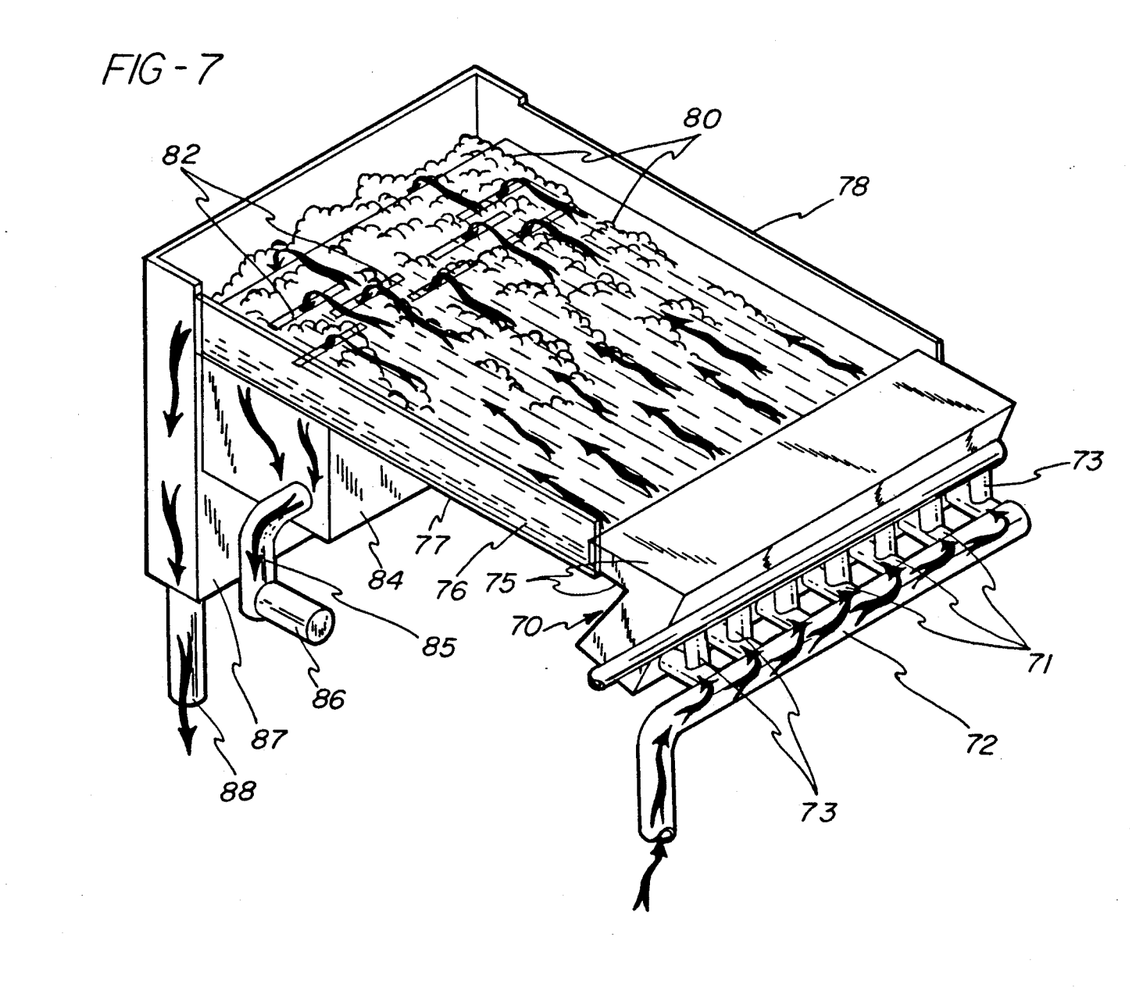
FIG. 7 is a diagrammatic perspective view showing another embodiment of the invention.

FIG. 7 illustrates another embodiment of the invention wherein, as in the form of FIGS. 1-4, a stream of aerated stock is produced by means of a flowbox 70 which may be essentially identical in construction with the flowbox 32, and which is similarly fed by multiple small inlet pipes 71 from a manifold 72 and air inlet connections 73. The flowbox 70 includes slice lips 75 forming a slot outlet through which it discharges gray stock as a relatively thin film 76 on the upper surface of a table 77 that is substantially horizontal, but preferably slightly inclined downwardly away from flowbox 70, and that has sidewalls 78.

Because the thickness of the film 76 is relatively small, e.g. ½ inch, the multiple bubbles initially distributed throughout this film have a correspondingly short distance through which to rise and form the desired layer of froth 80 as the film approaches the downstream end of the table 77. Separation of the liquid from the froth is then readily effected by way of drain slots 82 through which the accepted stock falls into a header 84 having a discharge pipe 85 provided with a control valve 86 for maintaining a desired level of liquid on top of the table 77. The froth overflows the downstream end of the table 77 into a header 87 having a discharge conduit 88.

It will be understood that in essentially the same way as described in connection with FIG. 1, multiple units like the one shown in FIG. 7 can be connected in series, with the accepts line 85 from each successive unit connected to the inlet manifold 72 of the next unit downstream therefrom. It should also be understood that the flowbox 70 could be replaced by any of the other aerating means discussed herein.

Figure 8:
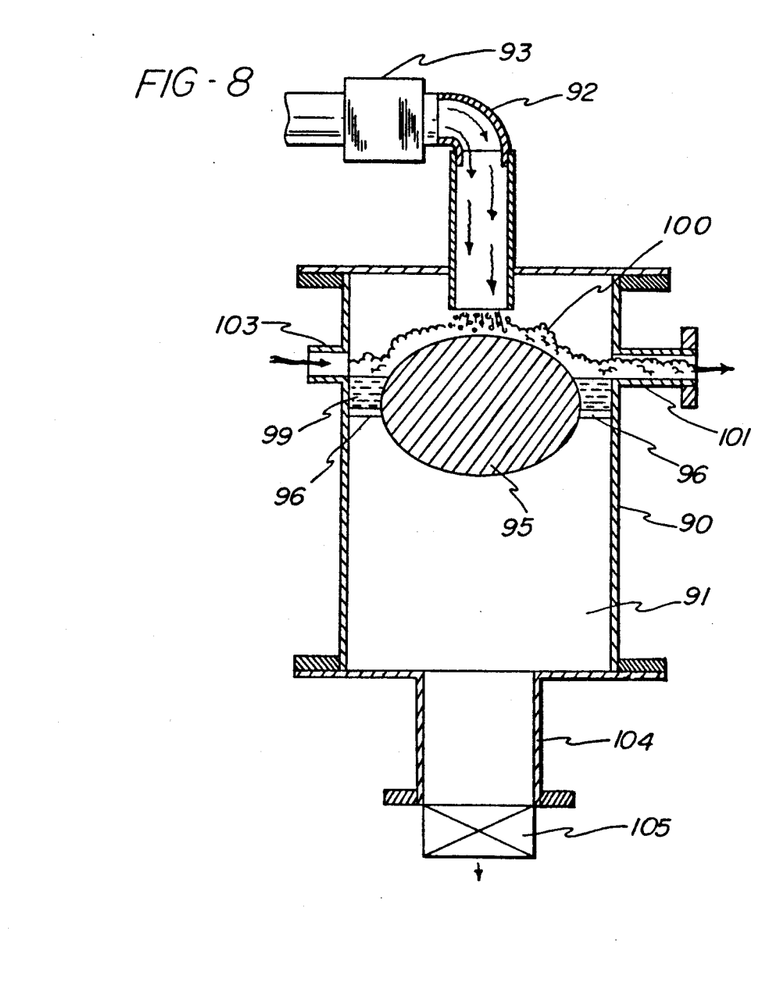
FIG. 8 is a somewhat diagrammatic view in vertical section illustrating a different embodiment of the invention.

FIG. 8 illustrates another form of froth flotation apparatus in accordance with the invention wherein a vertical walled casing 90 forms a chamber 91 into which aerated stock is delivered from above by a conduit 92 leading from aerating means 93 such as any of the forms of aerating means described herein through a top cover 94. A baffle 95, which has a generally horizontal upper surface that may be spherically curved as shown, is supported by means such as brackets 96 below and in centered relation with the conduit 92, and is of smaller outer periphery than the inner periphery of the casing 90 to provide an annular slot 99 therebetween.

In operation with the apparatus shown in FIG. 8, the stream of aerated stock impinging on the baffle 95 is spread thereby into a thin film covering the upper surface of the baffle, and because of the small thickness of this film, the bubbles therein quickly rise to the surface to form a layer of froth 100 for removal by way of a foam outlet 101, which preferably is connected to a source of vacuum to accelerate froth removal. In addition, an inlet 103 for pressure air may be provided on the opposite side of the casing 90 in order to blow the froth across the top of the baffle to the froth outlet 101.

An outlet conduit 104 for accepted stock leads from the bottom of the casing 90, and it should be provided with a control valve 105 which, as noted in connection with FIG. 1, should be operated to maintain the liquid level in the casing 90 just below the level of the froth outlet 101. It is to be understood that the apparatus shown in FIG. 6 is not limited to being made in circular form but could just as well be elongated in the direction perpendicular to the sheet, in which case the inlet conduit 92, the froth removal conduit 101 and the air inlet 103 could be slot-shaped rather than circular.

Figure 9:
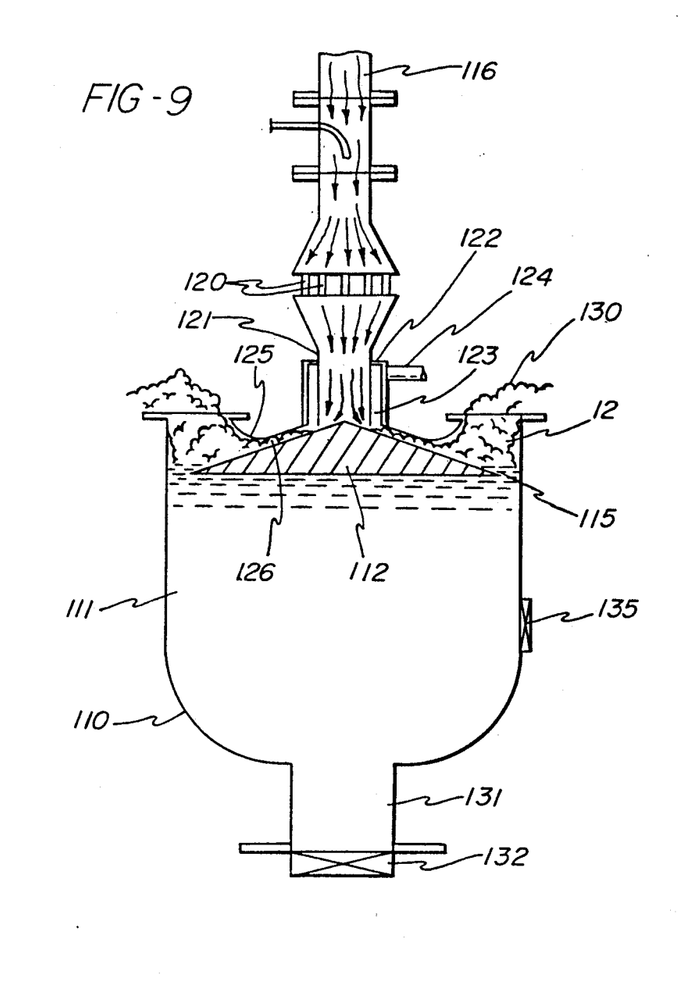

FIG. 9 shows still another form of froth flotation apparatus in accordance with the invention which, like the apparatus shown in FIG. 8, may be circular in horizontal section or may be elongated in the direction perpendicular to the sheet. This apparatus comprises a vertical walled casing 110 enclosing a chamber 111 having mounted therein below the top thereof a baffle 112 which is preferably frustoconical if the casing 110 is cylindrical or is roof-shaped if the casing is elongated. In either case, the outer periphery of the bottom of the baffle 112 is less than that of the casing 110 to leave an annular slot 115 therebetween.

A supply conduit 116 for gray stock may be connected to the chamber 111 through any of the aerating means described hereinabove, but it is shown as cooperating with aerating means comprising an air inlet 119 and multiple small tubes 120 connecting the downstream end of the conduit 116 with an inlet conduit 121 having its downstream end supported in closely spaced relation above the baffle 112. In addition, the discharge end of the inlet conduit 121 is surrounded by a tubular collar 122 of sufficiently larger inner diameter to provide an annular passage 123 between itself and the conduit 122 which has an inlet connection 124 for air. This collar 123 includes a skirt 125 which is flared outwardly in parallel relation with the baffle 112 to define a slot 126 therebetween, and this portion 125 extends to an outer portion 127 which flares upwardly away from the baffle 112 to define an annular slot 128 between itself and the casing 110.

In operation, the supply flow of aerated gray stock toward the baffle 112 is spread into a thin film in the annular slot 126, and then as this film continues to flow outwardly beyond the slot 126, the air bubbles therein quickly form the desired layer 130 of froth in the annular space between the baffle portion 113 and the casing wall. In addition, the flow of stock past the lower end of the annular passage 123 will create a venturi-type condition causing a flow of additional air into the inlet end of the slot 126 which may be augmented by pressurizing the air inlet 124, and this air aids in blowing the froth layer radially outwardly until it overflows the top of the casing into any suitable collection and conduit means, such as a trough surrounding the casing 110.

While the froth is being removed in this manner, the liquid constituent of the stock flows downwardly through the annular slot 115 into the bottom of the casing 110 and ultimately through the discharge conduit 131 and its adjustable control valve 132. For preferred conditions during continuous operation, the valve 132 should be operated by a level sensor 135, as indicated by the broken line 136, to maintain the liquid level just in chamber 111 above the outer periphery of the baffle 112.

FIG. 10 shows another form of the invention generally similar to those shown in FIGS. 8 and 9. In FIG. 10, a casing 140 surrounds a baffle in the form of a disk 141 of smaller diameter to provide an annular slot 142 therebetween. The disk 141 may be imperforate or may have perforations 143 therethrough, and it is provided at its center with a frustoconical boss 145.

A stock supply pipe 150 is supported above and in centered and partially interfitting relation with the boss 145 to provide an annular slot 151 therebetween. An annular collar 152 is similarly supported in slightly upwardly relation with the disk 141, and this collar is of sufficiently larger inner diameter than the outer diameter of the pipe 150 to provide an annular passage 155 therebetween.

In operation, the flow of stock through the slot 151 and past the lower end of the passage 155 creates a venturi effect which induces a flow of air through passage 155 that aerates the stock so that the desired layer of froth is formed along the top of the disk 141. This flow of air continually forces the froth layer radially outwardly until it flows over the outer periphery of the disk 141 into a suitable receiving trough 156. At the same time, the liquid film on top of the disk 141 will flow radially outwardly until it flows over the edge of the disk through the slot 142, or if the disk 141 is perforated, some of the film of the stock will flow through the perforations 143 into the chamber 140.

While the method herein described, and the forms of apparatus for carrying this method into effect, constitute preferred embodiment of this invention, it is to be understood that the invention is not limited to this precise method and forms of apparatus, and that changes may be made in either without departing from the scope of the invention which is defined in the appended claims.

What is claimed is:

1. Froth flotation apparatus for separating contaminant particles from a liquid suspension stock, comprising:
   (a) radially spaced outer, inner and intermediate vertical annular walls and an annular bottom wall connected to said vertical walls to form outer and inner substantially concentric annular chambers and a central discharge conduit,
   (b) means for delivering a stream of aerated stock into said outer chamber adjacent said bottom wall thereof for circulation therein while the bubbles in said stock rise through the stock in said chamber to form froth adjacent the top of said outer chamber,
   (c) said intermediate wall being of lesser height than said outer wall to provide an overflow outlet from said outer chamber to said inner chamber,
   (d) means on the top of said intermediate wall forming an annular generally horizontal upper surface of substantial radial width for spreading stock overflowing said intermediate wall into a thin film to expedite the formation of a layer of froth on the top of said overflowing stock, said upper surface being at a lesser height than the height of said outer wall,
   (e) said inner wall being slightly shorter in height than said intermediate wall to provide an overflow outlet from said inner chamber to said discharge conduit while maintaining the liquid level in said inner chamber close to that in said outer chamber,
   (f) means forming an outlet for accepted stock from the bottom of said inner chamber, and
   (g) means for controlling the flow of accepted stock from said outlet to maintain the level of said stock in said inner chamber sufficiently close to the top of said inner wall to cause froth on top of said stock to overflow said inner wall into said discharge conduit defined by said inner wall.

2. Froth flotation apparatus as defined in claim wherein said means for delivering aerated stock to said outer chamber comprises a flowbox including opposed upstream and downstream walls enclosing a chamber of substantial volumetric capacity, stock inlet passage means of small flow area in comparison with the volumetric capacity of said chamber connected to deliver stock to said chamber through said upstream wall toward said downstream wall at an oblique angle to said downstream wall to cause said chamber to function as an explosion chamber for said stock, upper and lower outlet walls connected to the upper ends of said upstream and downstream walls respectively and extending downstream from said explosion chamber and cooperating to form a slot outlet, means supporting said flowbox with said slot outlet positioned to discharge stock along the bottom of said outer annular chamber, a manifold connected to supply stock to the upstream end of said stock inlet passage means, and means for delivering air to said stock inlet passage means for mixture with the stock entering said explosion chamber through said inlet passage means.

3. Froth flotation apparatus as defined in claim 2 further comprising deflector means extending from the downstream end of said upper outlet wall and configured to define an outlet passage extending from said slot outlet which is of increasing height and decreasing width with respect to said slot outlet whereby the aerated stock discharged through said slot outlet is directed along the radially outer portion of said intermediate wall.

4. Froth flotation apparatus as defined in claim 2 wherein said means for delivering aerated stock to said outer chamber comprises multiple said stock inlet passage means of individually relatively small flow area, and means for delivering air directly to each of said stock inlet passage means for mixture with the stock entering said explosion chamber through said inlet passage means.

5. Froth flotation apparatus as defined in claim 1 further comprising means forming a cover cooperating with said outer wall to enclose said chambers, and means for maintaining superatmospheric pressure within said cover and outer wall.

6. Froth flotation apparatus as defined in claim 1 further comprising at least one baffle plate in said outer chamber secured to said outer and bottom walls and extending substantially radially across only a limited fraction of said outer chamber with the top thereof at a level below the top of said intermediate wall.

7. Froth flotation apparatus as defined in claim 1 wherein said inner wall is located eccentrically with respect to the center of said inner chamber to provide said inner chamber with portions of different radial dimensions.

* * * * *